Patented Feb. 20, 1934

1,948,179

UNITED STATES PATENT OFFICE 1,948,179

MERCURY CONTAINING PURINE COMPOUNDS AND PROCESS OF PREPARING THEM

Carl Ludwig Lautenschläger, Max Bockmühl, and Walther Persch, Frankfort-on-the-Main, Germany, assignors to Winthrop Chemical Company, Inc., New York, N. Y., a corporation of New York No Drawing. Application November 12, 1930, Serial No. 495,278, and in Germany March 21, 1929

16 Claims. (Cl. 260—13)

The present invention relates to mercury containing purine compounds and to a process of preparing them, more particularly to compounds of the following formula

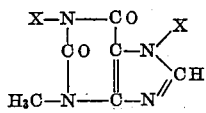

wherein one X stands for methyl, the other X for a group of the following constitution

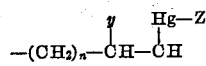

wherein Y stands for halogen, hydroxy or alkoxy, Z being a univalent acid radical, $n$ being 1 or 2.

We have found that compounds of valuable therapeutic properties are obtained by causing mercury salts, such as for instance mercury acetate, to act upon purine derivatives containing an unsaturated side chain, such as, for instance allyltheobromine or Δ—4 butenyl-theobromine, allyltheophylline or Δ—4 butenyl theophylline or the like. The mercury in these new compounds is fixed in the side chain, the double bond being split by the reaction.

The compounds have proved to be valuable therapeutic agents, especially strong diuretics.

The following examples illustrate the invention, but they are not intended to limit it thereto:

1. 22 grams of 1-allyltheobromine (cf. "Chemisches Zentralblatt" 1921, volume IV, page 1049) are dissolved in 500 cc. of methyl alcohol and the solution is mixed, while shaking, with 31.86 grams of mercuric acetate in 500 cc. of water. The liquid, which soon becomes clear, is shaken for 24 hours at room temperature. The whole is then evaporated in a vacuum and the residue is extracted with chloroform. After drying the chloroform extract the whole is concentrated and this concentrated chloroform solution is dropped on petroleum ether, whereupon the mercury compound separates in a pure form as white powder. The new mercury compound dissolves relatively easily in water. It contains 39.0 per cent. of mercury; 39.3 per cent. corresponds with the formula $C_{13}H_{18}O_5N_4Hg$. The compound has the following probable constitution:

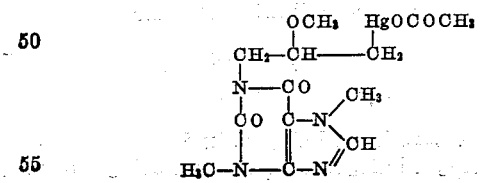

2. 22 grams of 7-allyltheophylline (cf. Friedländer "Fortschritte in der Teerfarbenfabrikation", volume 14, page 1325) are dissolved in 450 cc. of methyl alcohol and the whole is shaken for 22 hours with a solution of 31.86 grams of mercuric acetate in 500 cc. of water. The whole is then evaporated in a vacuum and the residue is dissolved in water. After the aqueous solution has been neutralized by means of sodium carbonate, it is extracted with chloroform. From the chloroform solution a gold-coloured oil is obtained which is the additive compound of mercury acetate and allyltheophylline. By shaking this compound in water with a saturated sodium chloride solution, it can be transformed into the corresponding chlorine compound which has the following formula: $C_{10}H_{13}O_3N_4.HgCl.H_2O$ (calculated : 40.9 per cent. of Hg; found: 41.3 per cent.). The chlorine compound melts at 184° C.–186° C.

3. 22 grams of 1-allyltheobromine are dissolved in 500 cc. of methyl alcohol and the whole is shaken for 12 hours with a solution of 27.2 grams of mercuric chloride in 500 cc. of water and a solution of 8.2 grams of anhydrous sodium acetate in 100 cc. of water. The mercury chloride additive compound gradually separates; it is filtered by suction and recrystallized from methyl alcohol. It forms a white crystalline mass melting at 168° C.–170° C., which is soluble in caustic soda solution and can be separated therefrom unchanged by addition of acid. It contains 40.4 per cent. of mercury (calculated: 40.9 per cent.).

4. 4.68 grams of Δ—4 butenyl-theobromine of the following formula:

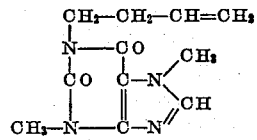

(prepared from sodium theobromine and 1-bromobuten-(4) ($Br$—$CH_2$—$CH_2$—$CH=CH_2$) in 50 cc. of methyl alcohol are shaken for 18 hours with 6.37 grams of mercuric acetate in 50 cc. of water. The whole is evaporated in a vacuum and the residue is dissolved in water and neutralized. The neutral solution is extracted with chloroform. An oil is obtained from the chloroform which is the additive compound of mercury acetate and Δ—4 butenyl-theobromine. By mixing its solution in water with sodium chloride solution, the corresponding chlorine compound is formed which, when recrystallized from a mixture of glycerindiethyl ether and water, is obtained in a pure form.

5. 7—Δ—4 butenyl-theophylline yields, under the conditions given in Example 4, the aditive compound of mercury and 7—Δ—4 butenyl theophylline. Found: 39.9 per cent. of Hg; calculated: 39.9 per cent. for $C_{12}H_{17}O_3N_4 \cdot HgCl$.

In the compounds obtained according to the above-given examples the mercury is bound in a complex manner. It is not split off by means of caustic soda solution, but only after a prolonged action of hot ammonium sulfide.

We claim:

1. The process which consists in causing a mercury salt to act upon the methyl-alcoholic solution of a compound of the following formula:

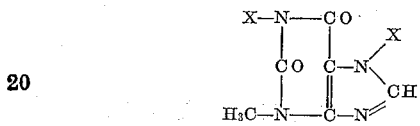

wherein one X stands for methyl, the other X stands for an alkyl of the allyl series.

2. The process which consists in causing a mercury salt to act upon the methyl-alcoholic solution of a compound of the following formula:

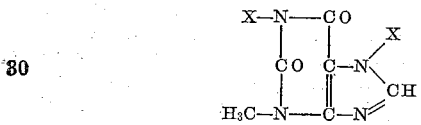

wherein one X stands for methyl, the other X stands for an allyl or butenyl radical, by agitating the reaction mixture for several hours.

3. The process which consists in causing mercury acetate to act upon the methyl-alcoholic solution of a compound of the following formula:

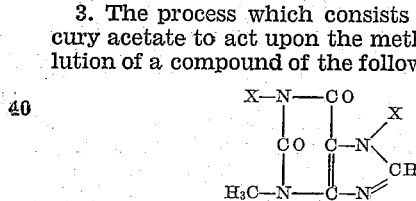

wherein one X stands for methyl, the other X stands for an allyl or butenyl radical, by agitating the reaction mixture for several hours.

4. The process which consists in causing an aqueous solution of mercury acetate to act upon the methyl-alcoholic solution of a compound of the following formula:

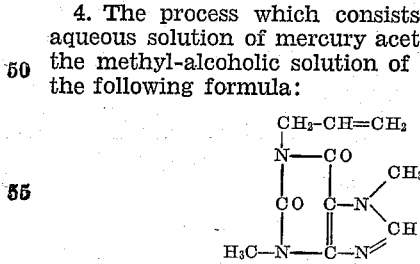

by agitating the reaction mixture for several hours concentrating the solution by evaporation, extracting the residue with chloroform and adding the chloroformic solution to petroleum ether.

5. The process which consists in causing an aqueous solution of mercury acetate to act upon the methyl-alcoholic solution of a compound of the following formula:

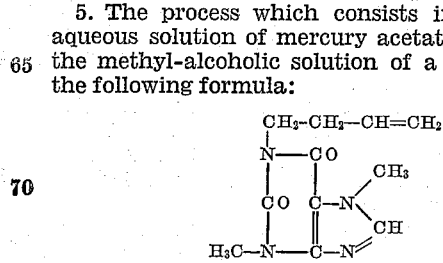

by agitating the reaction mixture for several hours concentrating the solution by evaporation, dissolving the residue in water and extracting the neutralized aqueous solution with chloroform.

6. The process which consists in causing an aqueous solution of mercury acetate to act upon the methyl-alcoholic solution of a compound of the following formula:

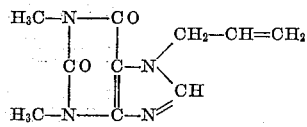

by agitating the reaction mixture for several hours concentrating the solution by evaporation, dissolving the residue in water and extracting the neutralized aqueous solution with chloroform.

7. The process which consists in causing an aqueous solution of mercury acetate to act upon the methyl-alcoholic solution of a compound of the following formula:

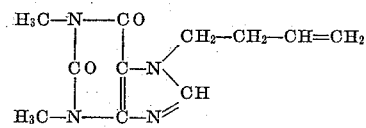

by agitating the reaction mixture for several hours concentrating the solution by evaporation, dissolving the residue in water and extracting the neutralized aqueous solution with chloroform.

8. The compounds of the following formula:

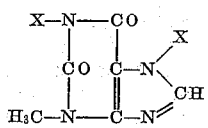

wherein one X stands for methyl, the other X stands for an aliphatic saturated hydrocarbon of 3 or 4 carbon atoms, containing mercury.

9. The compounds of the following formula:

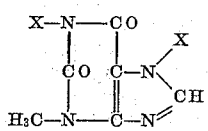

wherein one X stands for methyl, the other X stands for a group of the following constitution:

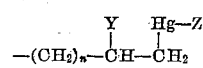

wherein Y stands for halogen, hydroxy or alkoxy, Z being a univalent acid radical, n being 1 or 2.

10. The compounds of the following formula:

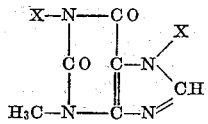

wherein one X stands for methyl and the other X for a group of the following formula

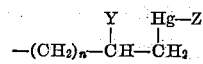

wherein Y stands for halogen, hydroxy or methoxy, Z being a halogen or acetoxy, n being 1 or 2.

11. The compounds of the following formula:

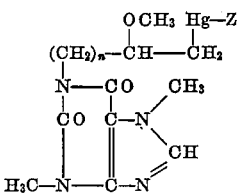

wherein Z stands for chlorine or acetoxy, $n$ being 1 or 2.

12. The compound of the following formula:

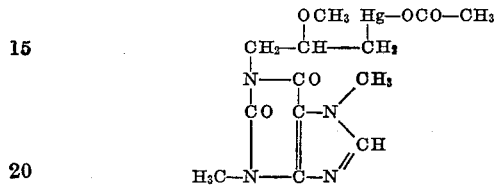

being a white powder, relatively easily soluble in water.

13. The compound of the following formula:

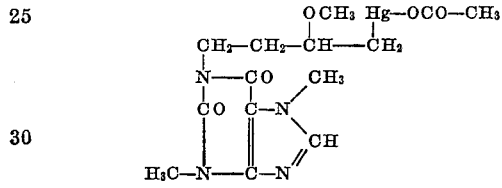

being an oil.

14. The compounds of the following formula:

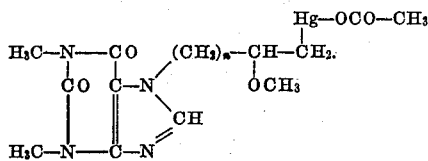

$n$ being 1 or 2.

15. The compound of the following formula:

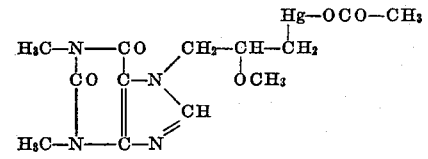

being a gold-yellow oil.

16. The compound of the following formula:

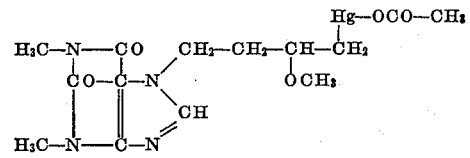

being a gold-yellow oil.

CARL LUDWIG LAUTENSCHLÄGER.
MAX BOCKMÜHL.
WALTHER PERSCH.